No. 804,576. PATENTED NOV. 14, 1905.
C. BOUCHER.
MACHINE FOR MAKING BOTTLES, FLASKS, &c.
APPLICATION FILED NOV. 13, 1903.
5 SHEETS—SHEET 1.

FIG. 1

Witnesses:
Henry J. Suhrbier
Fred Holman

Inventor:
Claude Boucher
By Gemen Niles
Attorneys.

No. 804,576. PATENTED NOV. 14, 1905.
C. BOUCHER.
MACHINE FOR MAKING BOTTLES, FLASKS, &c.
APPLICATION FILED NOV. 13, 1903.

No. 804,576. PATENTED NOV. 14, 1905.
C. BOUCHER.
MACHINE FOR MAKING BOTTLES, FLASKS, &c.
APPLICATION FILED NOV. 13, 1903.

Witnesses:
Henry J. Suhrbier
Fred Holman

Inventor
Claude Boucher
By Gowell Niles
Attorneys.

UNITED STATES PATENT OFFICE.

CLAUDE BOUCHER, OF COGNAC, FRANCE.

MACHINE FOR MAKING BOTTLES, FLASKS, &c.

No. 804,576. Specification of Letters Patent. Patented Nov. 14, 1905.

Application filed November 13, 1903. Serial No. 181,049.

*To all whom it may concern:*

Be it known that I, CLAUDE BOUCHER, a citizen of the Republic of France, and a resident of Cognac, Charente, France, have invented new and useful Improvements in or Relating to Machines for Making Bottles, Flasks, and Similar Articles, which improvements are fully set forth in the following specification.

This invention relates to a machine for use in the manufacture of bottles, flasks, and other similar articles of blown glass.

The primary object of the invention is to provide means whereby the elongation of the glass blank after it has been taken out from the first mold can be effected in two successive operations and said blank transformed into a perfect blank before it is placed in the finishing-mold, in which it receives its final shape.

It must be pointed out that as a rule bottles manufactured mechanically present a rough appearance and have asperities and lines on their outside surfaces. Moreover, owing to thick portions alternating with thinner parts the strength of the bottle is decreased, and this uneven thickness produces a kind of hammered appearance inside and an unsatisfactory light effect. These drawbacks are due to the fact that the glass at the moment it is poured into the first or rough mold is not sufficiently homogeneous and that the parts in contact with the pontee are more cooled than the surface glass gathered and which has been rolled up at the last moment. The glass having been poured out into the rough mold under these conditions of unequal temperature, the hotter portions naturally expand and become too thin under the influence of blowing, the portions more solidified resisting and forming ridges and thin portions on the inner surface of the bottle. While the difference of temperature causes the drawbacks described, the impossibility of introducing the glass in a compact mass into the rough mold causes formation of rough places which decrease during the blowing, but nevertheless remain visible to such an extent as to give the bottle a rough appearance and to deprive the glass of a great part of its natural brilliancy. The drawbacks the causes of which have been just explained can be avoided by lengthening the blank to a sufficient extent before introducing it into the finishing-mold, in which it receives its final shape. In order to prove the efficiency of this method, it is sufficient to take a blank covered with numerous rough edges and asperities formed in the rough mold and to lengthen it to a sufficient extent, even to the extent of forming it into a tube. As the blank is being lengthened the rough places begin to disappear, and when the lengthening has been carried out to a sufficient extent they completely disappear and the glass regains all its natural brilliancy. It is in order to obtain this result that the device to be described and illustrated has been designed, for it is very difficult to lengthen the blank without the glass becoming too thin at certain places.

In the accompanying drawings.

Similar characters of reference designate identical parts throughout the several views.

Figure 1:
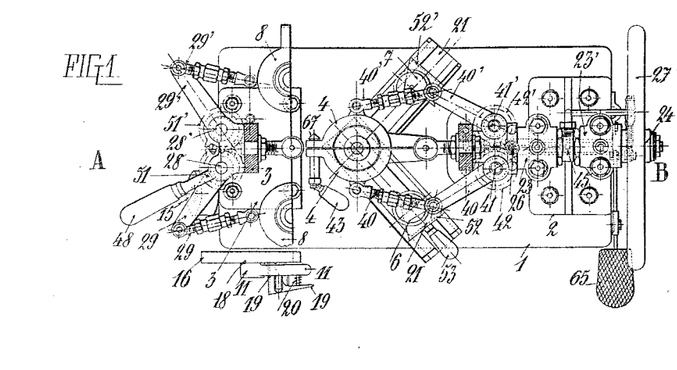
Figure 1 is a sectional plan view of a machine embodying the invention, taken on line A B, Fig. 2.

Fig. 1 shows the rough mold 4 closed and the finishing-mold 8 open, and also rods or levers 29 29' and 40 40', by means of which is effected the opening and the closing of the molds. The same figure also shows slide-blocks 52 and 52', supporting the mold 6 and the sleeve 7, which are alternately caused to slide under the blank 50 when the necessary lengthening operation takes place.

Figure 2:
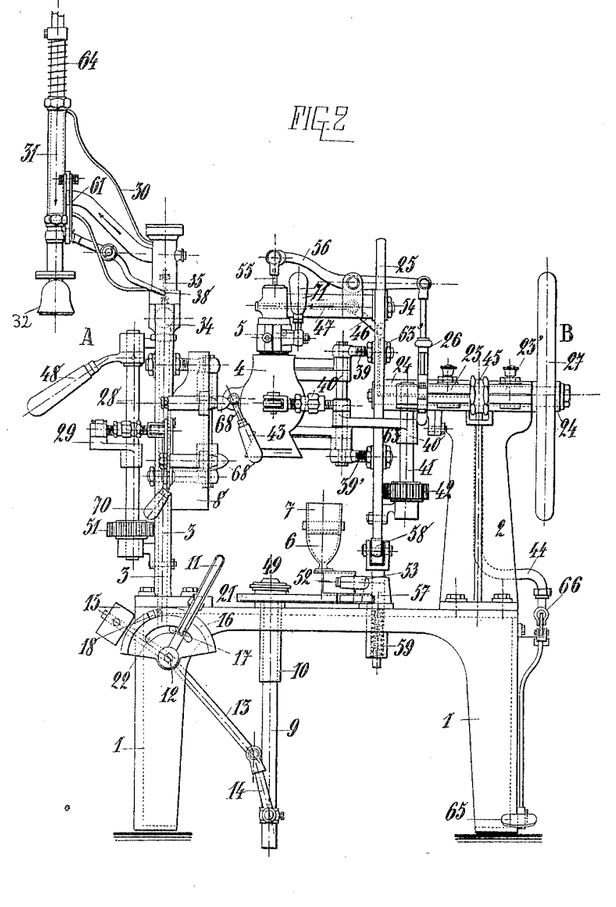
Figs. 2 and 3 are elevations at right angles to each other.

Fig. 2 is a side elevation of the machine, showing the frame 1, standards 2 and 3, the rough mold 4 closed and surmounted by a neck-mold 5, the finishing-mold 8 open, levers for effecting the closing and the opening of the molds, the lever 11 serving to raise, by means of the plunger 9, the mold 6, the sleeve 7, and the bottom 49 of the finishing-mold; an eccentric 26, which operates, by means of a lever 56, a mandrel which is automatically introduced into or withdrawn from the neck of the bottle and the neck-mold 5; a movable bracket 30, carrying a compressor 31, and, finally, a lever or wheel 27 by means of which the rough mold 4 and the ring-mold 5 are turned over and placed into the position that they must occupy, according to the stages of the manufacture.

Figure 3:
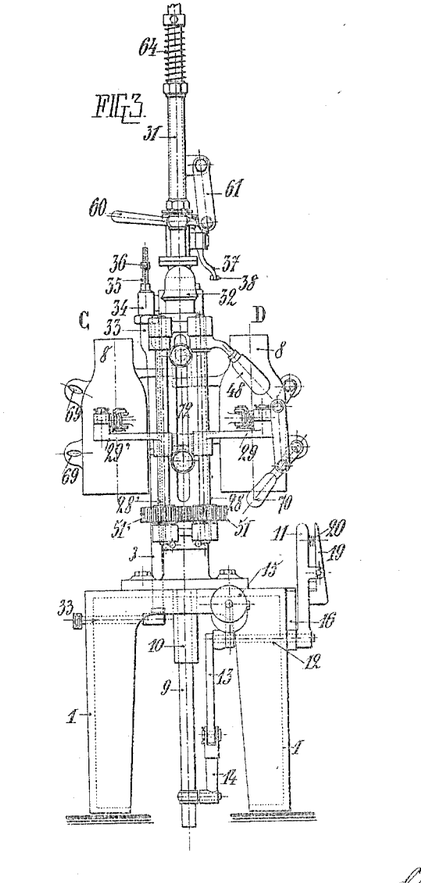

Fig. 3 is an end elevation of the machine, showing the finishing-mold 8 open; spindles 28 28', on which are mounted the rods 29 29' for bringing nearer together or moving farther apart the two halves of this mold; movable bracket and rod 35 of a valve 34, which admits compressed air when raised by means of a lever 37, and, finally, the lever 11 and a pawl 19, adapted to engage in a recess in a sector 16.

Figure 4:
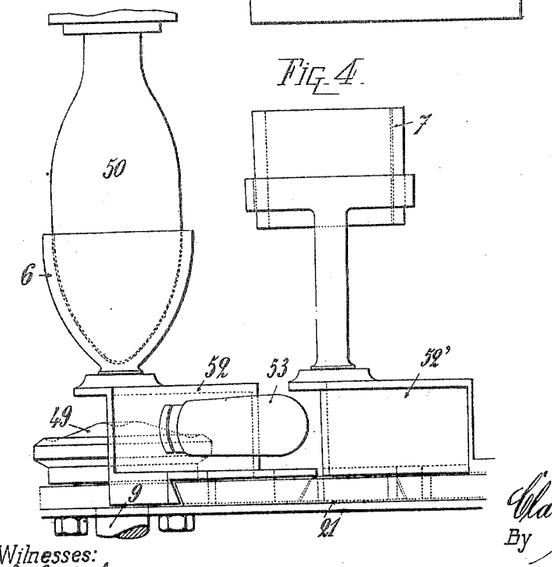
Figs. 4, 5, 6, 7, and 8 are detail views.

Fig. 4 is a view of the slide-block 52, supporting the mold 6, and of the slide-block 52', supporting the sleeve 7. The blank 50 is shown supported by the mold 6 while the lengthening of its upper portion is taking place.

Figure 5:
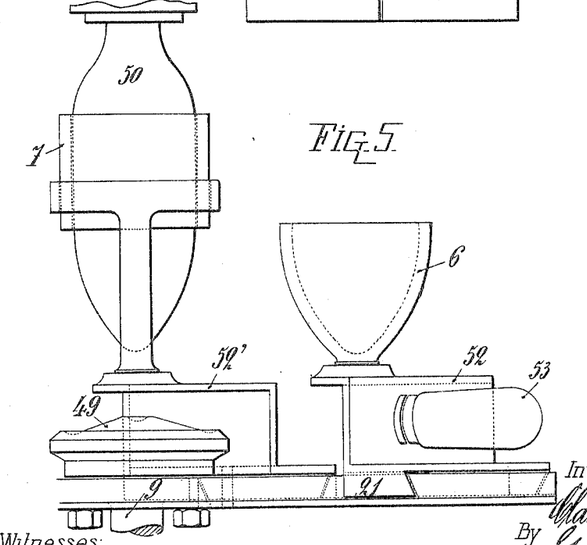

Fig. 5 is also a detail view showing the carriage 21, the blocks 52 52', the mold 6, and the sleeve 7. In this figure, however, the blank 50 is shown supported intermediately by the sleeve 7, while its lower portion is being lengthened to the desired extent.

Figures 6, 8:
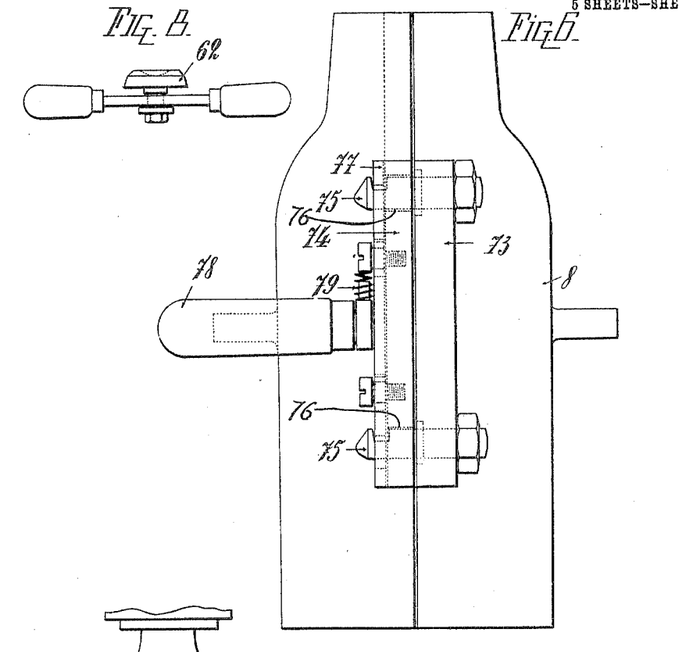
Figure 7:
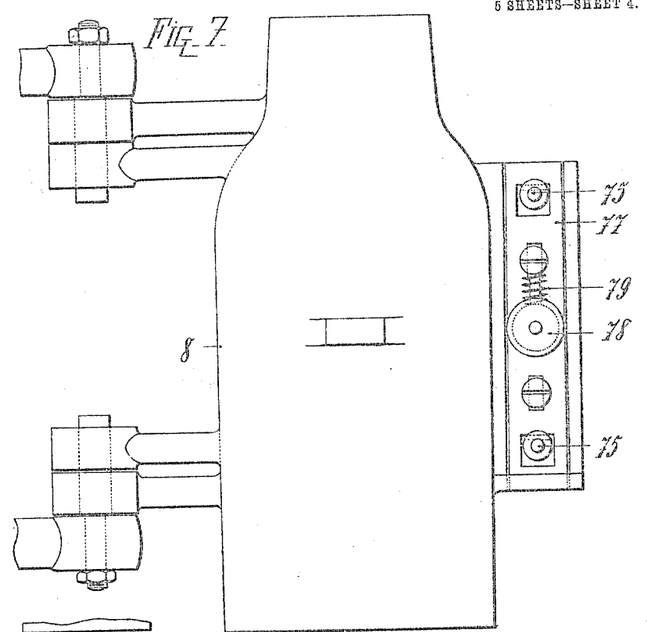

Figs. 6 and 7 show the finishing-mold 8 with an improved locking device for closing the molds, hereinafter described.

Fig. 8 shows the bottom 62 of the rough mold 4, serving to close this mold during the admission of compressed air through the pipe 44 for the purpose of blowing out the block.

The machine shown in the figures described consists of a frame 1, to which are secured standards 2 and 3 and a shell 57. The rod 9 with the disk supporting the bottom 49 of the finishing-mold 8 and the slide-blocks 52 and 52', supporting the molds 6 and the sleeve 7, slides in a sleeve 10, which passes through an opening in the frame 1. The lever-arm 11 is mounted on a spindle 12, which operates an arm 13 and a rod 14, hinged thereto, for raising and lowering the rod 9 for the purpose of bringing into position the bottom 49 of the finishing-mold, as well as the mold 6 and the sleeve 7. A weight 15 serves to balance the weight of these molds and of the gear for raising and lowering them. Sector 16 is adjustably secured to the frame by a bolt 17 and a nut and is provided with a recess 18, with which is caused to engage the end of a pawl 19 when it is desired to hold the bottom 49 raised in the position which it must occupy when the two halves of the finishing-mold 8 come together and surround and fix it. A spring 20, placed between the lever 11 and the pawl 19, holds the end of the pawl in engagement with the recess 18. By pressing the pawl the end becomes disengaged from the recess 18, and the bottom 49, as well as the carriage 21, descends again on to the frame, as may be seen in Fig. 2. Vertical adjustment of the bottom 49 is effected by means of a groove 22 in the sector, so that the relative positions of the lever 11 and recess 18 can be accurately adjusted.

The standard 2 is provided at the top with two bearings 23 23', in which rotates a horizontal spindle 24, on which is mounted a beam or frame 25 and on which rotates an eccentric 26. A hand-wheel 27, which serves to operate the beam and the eccentric, is keyed to the other end of the spindle 24. The other standard 3 supports the finishing-mold 8, as well as the spindles 28 and 28' and the rods 29 29', which serve to open and close the two halves of the mold. At the top it supports another standard or bracket 30, in which slides a tube 31, terminating in a bell-mouth 32, which is pressed against the orifice of the rough mold during the compression.

Compressed air or any other suitable fluid used for compressing the glass in the rough mold arrives through a pipe 33, Fig. 3, provided with a valve 34, terminating in a spindle 35, provided with an adjusting-nut 36. On the other hand, the movable bracket 30 carries a lever 37, terminating in a fork 38, engaging under the nut 36, said lever by means of its handle 60 and rod 61 opening the valve 34 exactly at the moment when the bell-mouth 32 of the compressor is applied against the orifice of the rough mold. This raising of the valve which closes the pipe 33 results in the fluid being admitted into the empty space and exercising its compressing action. As soon as this operation has been finished pressure on the handle 60 is released and the valve descends again and closes the pipe 33.

The rough mold 4 is secured to the beam 25 by screw-bolts 39 39', which are adjustable in the slots in the said beam for the purpose of adjusting the mold in vertical direction while horizontal adjustment is effected with the aid of the screw-threaded bolts and nuts. The two halves of the rough mold are brought together for closing it to moved away for opening by means of rods 40 40', operated by spindles 41 41', to which are secured engaging toothed wheels 42 42'. When it is desired to open the mold, it is sufficient to pull the handle 43, which by moving away the half of the mold to which it is secured closes up the rods 40, which rotate the spindle 41, and through the toothed wheel 42, which transmits the movement to the other wheel 42' and to the spindle 41, to which it is keyed, the rods 40' close up and move away the other part of the rough mold. In order to bring the two halves of the rough mold together, it is sufficient to reverse the operation—that is to say, to push back the half mold 4 by means of its handle 43. By opening out the rods the spindle 41 is caused to turn and transmits movement to the spindle 41' through the medium of the wheels 42 42', and thus operate the rods 40', so that the two halves of this mold are brought into the position shown in Fig. 1 and completely closed together.

Compressed air is admitted to the neck-mold 5 through the pipe 44, Fig. 2, connected to the branch of the sleeve 45, mounted on the hollow spindle 24. After having passed through this spindle the air passes into the beam 25 and through a pipe 46, which leads it into the arm 47, whence it penetrates into the neck-mold for the purpose of completing the perforation of the neck and afterward forcing the glass against the walls and the bottom of the rough mold, and finally completes the blowing of the bottle in the finishing-mold. The path of the air is indicated on the drawings by dotted lines and arrows. The two halves of the finishing-mold are moved away for the purpose of opening or brought together for the purpose of closing by means similar to those described for the rough mold, with the difference that the handle 48 used for this operation is secured to the spindle 28. By moving this handle in the direction of the mold the rods 29 29' open out and close the mold until it comes to rest against the bottom 49 and incloses the blank 50. In order to move apart the two halves of this mold from each other and bring them into the position shown in Figs. 1, 2, 3, it is of course necessary to reverse the operation—that is to say, to push the handle so as to bring it, as well as the rods 29 29', into the position shown in Figs. 1, 2, and 3, in which the finishing-mold is shown open. The bottom 49 of the finishing-mold 8 as well as the carriage 21 are supported by the rod 9. The bottom 49, the cup-shaped mold 6, and the blank-supporting sleeve 7 are therefore raised, lowered, or held in place by operating the lever 11. When the lever is in the position shown in Fig. 2, with the bottom 49, mold 6, and the sleeve resting on the frame, it is necessary to move the handle 11 toward the left when it is desired to raise the rod 9 and the parts that it supports. In order to hold the bottom 49 in place at a desired height for the purpose of bringing the two halves of the finishing-mold together around it, the pawl 19 must engage with the recess 18, in which it is held by the spring 20. In order to disengage the pawl and to allow the bottom 49 to descend onto the frame, it is sufficient to press the pawl 19 against the handle 11 of the lever.

The mold 6 is mounted on the block 52 and the sleeve 7 on the block 52'. These blocks freely slide on the carriage 21, so that they may be alternately brought into the positions in which they are shown in Figs. 4 and 5. The sleeve 6 and mold 7 are thus both longitudinally and laterally adjustable. The mold 6 being placed in front, it is pushed back by means of the handle 53 until it is in the center above the bottom 49 and well in the axis of the glass-blank when it is desired to place it in the mold and to support it while its upper portion is being stretched. This having been effected, the mold 6 is withdrawn by means of the handle 53.

In order to bring the sleeve 7 to the center in the position previously occupied by the mold 6, the same operation is effected by means of a handle also arranged on the block 52', supporting the said sleeve, which is caused to slide back when the glass-blank has been suitably lengthened in its lower portion. At this moment the mold 6 and the sleeve 7, having returned to the positions they occupy in Fig. 1, the bottom 49 is raised to the desired height and held in place by means of the pawl 19, engaging as already described.

The beam 25, secured to the end of the spindle 24, carries the rough mold 4 and the neck-mold 5. The rough mold is adjusted on the beam to such a height that the neck comes to rest exactly against the neck-mold. Then by screwing up the clamping-nuts 63 63' the mold is held in place. The finishing-mold is secured in the same way by screw-threaded bolts passing through a slot 72 in the standard 3. The end of the arm 47, carrying the neck-mold 5, passes through an aperture in the beam 25 and is clamped to the latter by a nut 54. The neck-mold is secured to the end of the arm 47, terminating in a thickened portion forming a stuffing-box, in which slides the rod 55 of the mandrel.

The eccentric 26, which rotates on the spindle 24, operates, by means of a pivoted lever 56, the mandrel which is automatically forced into the neck-mold when the rough mold is turned over, opening upward to receive the glass, or automatically withdrawn when the mold is turned over, opening downward, as in Fig. 2. It is only at that moment, the mandrel being withdrawn from the neck and from the ring-mold, that compressed air can enter the neck in order to force the glass against the walls and the bottom of the rough mold.

The shell 57, secured to the frame 1, holds the rough mold 4 in place by means of the beam 25, terminating in a recess with which engages a roller 58, held in engagement by a spring 59, Fig. 2.

When the two halves of the molds are brought together, they are generally held in place by projections on one half engaging with holes in the other half, as shown in Figs. 1, 2, and 3. This system of closure has the drawback of requiring an effort on the part of the workman, and as the projections wear out very quickly, owing to the friction which is exercised on the ouside, the two halves of the mold soon do not close tightly, and the glass penetrating into the space so formed forms rough edges on the body of the bottle. These drawbacks are obviated by the closing device shown in Figs. 6 and 7, which consists of a projecting portion or lug 73, secured to one half of the mold 8 and provided with pins or projections 75. The other half of the mold is provided with a projecting lug 74, corresponding as regards the length and width to the lug 73. The lug 74 is provided with a groove extending throughout the whole of its length, in which a plate 77 can slide freely. Two holes 76, almost opposite these pins 75, being slightly lower, are made in this plate 77, which is provided with a handle 78 and a spring 79. The working of the device is as follows: When the two halves of the mold have been brought together, they are secured firmly by raising slightly the plate 77 by means of the handle 78. The pins 75 then enter the holes in the lug 74 and in the plate 77, which is thereupon released and engages with a slot in the pin 75 and is so held by the spring 79. To open the mold, it is sufficient by means of the handle 78 to raise the plate 77, which will slide in the groove, whereupon the pins become disengaged and the mold can be opened. The system of closing is shown in Figs. 6 and 7 applied to a finishing-mold; but it can of course be used equally well for closing rough molds or neck-molds. It could also be used for molds as employed in hand manufacture by the old processes.

The manufacturing of bottles and other similar articles on the improved machine is as follows: The rough mold 4 having been placed with its opening upward is held in position by the shell 57 and the beam 25. The necessary quantity of glass is poured out into this mold. This glass, which is sufficiently fluid, flows down into the neck-mold 5, which in this position is under the rough mold, and is consequently filled with glass in the same way as the rough mold, which latter, however, is not quite filled, a short space being left between the glass and the edge of the mold. As soon as the glass has been poured out into the rough mold the workman by means of the handle 60 turns the movable bracket 30 until the bell-mouth 32 engages with the orifice of the rough mold. At this moment the fork 38, operated by the lever 37 and the rod 61, engages with the nut 36 and raises the valve 34, which remains open and admits compressed air until the pressure on the orifice of the mold is released and the compressor raised by the spring 64 into the position shown in Fig. 2. The compression of glass by compressed air, steam, or any other suitable fluid having been duly effected and the glass rendered homogeneous and the ring properly molded, the bottom 62, Fig. 8, is fixed to the orifice of the rough mold 4 and the latter reversed, opening downward, by means of the hand-wheel 27. While this mold is being turned through an angle of one hundred and eighty degrees, the mandrel is automatically withdrawn, by means of the eccentric 26, from the orifice of the neck, which it closed at the mouth by a collar, but into which it penetrated to a sufficient extent to insure that the glass, becoming molded round the end of the said mandrel, produced a cavity corresponding to the diameter that it is desired to give to the interior of the neck of the bottle. The mandrel having been withdrawn to a sufficient extent, a pedal 65 is depressed and operates a valve 66, admitting through the pipe 44 compressed air, which entering the cavity formed by the mandrel perforates the neck and forces out the glass against the walls and the bottom of the rough mold until the whole periphery has become sufficiently solidified by contact with the comparatively cool metal. This having been effected, the bottom 62 is removed and the rough mold opened by disengaging the projection 67 and moving apart the two halves of the molds by means of handle 43, as already explained. The blank 50, disengaged from the rough mold, remains suspended by the ring of the neck-mold 5. The mold 6 is immediately brought under the blank by means of the handle 53 and raised by pressing down the lever 11 until it surrounds and supports the blank, so that the upper portion, which is free, can be properly lengthened. As soon as this has been done the mold 6 is withdrawn and the sleeve 7 brought forward and raised by means of the lever 11 until it surrounds the intermediate portion of the blank 50 and supports it while it is being lengthened to the desired extent at the bottom. In this way the blank is stretched to a sufficient extent to cause all the roughness and asperities to disappear, and this lengthening is effected without producing excessively thin parts, which would impair the strength of the bottle. The lengthening having been finished, the sleeve 7 is lowered and pushed back on the carriage, so as to allow the bottom of the blank to rest on the bottom 49. Then the two halves of the finishing-mold are brought together by means of the handle 48, the mold surrounding the bottom 49 and inclosing the blank 50, which receives its final shape by the glass being forced by compressed air against the walls and the bottom of that mold. When the bottle has no inscription or decoration, air at a very low pressure is used for blowing the bottle in the finishing-mold. In this way a more uniform thickness is obtained, as the glass expands slowly and gradually. As a higher pressure is required for the other operations, air or any other suitable fluid is generally used at the pressure of half an atmosphere for forcing the glass in the rough mold and of quarter of an atmosphere for blowing the glass in the rough mold and a pressure of one-tenth of an atmosphere for forming the bottle in the finishing-mold. These pressures can of course vary in accordance with the composition of the glass and the temperature at which it is worked. The bottle having received its final shape by the thorough pressing of the glass against the walls and the bottom of the finishing-mold, the latter is opened by disengaging the projections 68 and opening the two halves, which are brought into the position shown in Figs. 1, 2, and 3. Then the neck-mold is opened by disengaging its projection and the bottle removed and placed in the annealing-furnace.

Having thus described my invention, I claim as new and desire to secure by Letters Patent—

1. In a machine such as described, the combination of means for supporting the top or neck of the blank, and means for supporting the intermediate portion thereof during the lengthening of the lower portion.

2. In a machine such as described, the combination, with means for supporting the neck of the blank, of means for supporting the blank intermediately, and means for supporting the bottom of the blank.

3. In a machine such as described, means for supporting the intermediate portion only of the roughly-formed blank.

4. In a machine such as described, the combination, with means for supporting the blank at one end, of separate means for supporting the intermediate portion only of the same.

5. In a machine such as described, the combination of means for supporting the blank at one end, and a sleeve for supporting the same intermediately of its length.

6. The combination, with means for suspending the roughly-formed blank at one end, of means for intermediately embracing and supporting the intermediate portion only of the blank.

7. The combination of means for supporting the roughly-formed blank at one end, means for supporting the intermediate portion only of the blank, and means for varying the relative position of said two supporting means.

8. The combination of means for supporting the roughly-formed blank at one end of the same, means for supporting the blank at its intermediate portion, and means for adjusting said last-named means relatively to said first-named means.

9. The combination of means for supporting the neck of the roughly-formed blank, means below said first-named means for supporting the intermediate portion of the same, and means for vertically adjusting said last-named means.

10. In a machine for manufacturing glass bottles, the combination, with means for supporting the top or neck of the blank, of laterally-adjustable means for supporting the intermediate portion of the same.

11. In a machine for manufacturing glass bottles, in combination, means for suspending the top of the blank, and laterally and longitudinally adjustable means for supporting the intermediate portion thereof.

12. The combination, with a neck-mold, of a blank-supporting sleeve.

13. The combination, with a neck-mold, of a laterally-adjustable blank-supporting sleeve.

14. The combination, with a neck-mold of a longitudinally-adjustable blank-supporting sleeve.

15. A machine such as described including in its construction a neck-mold, and a laterally and longitudinally adjustable blank-supporting sleeve coöperating therewith.

16. The combination, with the neck-mold, of the carriage below the same, and the means on said carriage for supporting the roughly-formed blank at its intermediate portion.

17. In a machine such as described, the combination, with the neck-mold, of a blank-supporting sleeve movable toward and away from the same.

18. In a machine such as described, the combination, with the neck-mold, of a carriage, and a blank-supporting sleeve adjustable on said carriage.

19. In a machine such as described, the combination, with the neck-mold, of a carriage adjustable toward and away from the same, and a blank-supporting sleeve mounted on said carriage.

20. In a machine such as described, the combination, with the neck-mold, of a carriage adjustable toward and away from the same, and a blank-supporting sleeve adjustably mounted on said carriage.

21. In a machine such as described, the combination, with the neck-mold, of a carriage below the same, and a blank-supporting sleeve horizontally slidable on said carriage.

22. The combination, with the neck-mold, of a carriage below the same, means on said carriage for supporting the base of the blank, and means on said carriage for intermediately supporting the blank.

23. The combination, with the neck-mold, of a carriage below the same, means on said carriage for supporting the base of the blank, and means also on said carriage for intermediately supporting the blank, said two supporting means being independently adjustable.

24. In a machine such as described, a sleeve for supporting the intermediate portion of the blank, and a mold for supporting the base of the same.

25. In a machine such as described, a sleeve for supporting the intermediate portion of the blank, and a mold for supporting the base of the same, said sleeve and mold being independently adjustable.

26. In a machine such as described, a neck-mold, a blank-supporting sleeve, and a cup-shaped mold mounted independently of said sleeve.

27. A machine such as described, including a neck-mold, a carriage below the same, a sleeve mounted on said carriage, and a cup-shaped mold also mounted on said carriage.

28. A machine such as described, including a neck-mold, a vertically-movable carriage, and means on said carriage for supporting the intermediate portion of the roughly-formed blank during the lengthening of the lower portion thereof.

29. The combination, with the neck-mold, of the carriage 21, and the mold 6 and sleeve 7 independently slidable thereon.

30. In a machine such as described, the combination, with the neck-mold, of a vertically-movable carriage below the same, a cup-shaped mold slidable on said carriage, and a blank-supporting sleeve also slidable on said carriage.

31. A machine such as described, including in its construction a neck-mold, a horizontally-movable carriage below the same, and means mounted on said carriage for intermediately supporting the roughly-formed blank.

32. A machine such as described, including in its construction a neck-mold, a vertically and horizontally movable carriage below the same, means on said carriage for supporting the roughly-formed blank at its intermediate portion, and means for supporting the base of the blank.

33. In a machine for manufacturing bottles and similar articles of blown glass, the combination of a bed-plate and mold supported above the same, of a vertically-movable carriage on said bed-plate, a hollow mold and a sleeve adjustably mounted on said carriage, and means for actuating said carriage.

34. In a machine for manufacturing bottles and similar articles of blown glass, the combination with a bed-plate and molds supported above the same, of a movable carriage on said bed-plate, and a hollow mold and sleeve independently slidable on said carriage.

35. In a machine for manufacturing bottles and similar articles from blown glass, a glass-mold, consisting of two parts, a lug on each of said parts, one of said lugs having holes therein, a movable plate upon said lug having holes registering with the holes in the same, pins on the other of said lugs engaging the holes in said plate and in said first-named lug, said pins having slots therein engaging said plate, means for normally holding said plate into engagement with said slots, and means for disengaging the same.

36. In a machine for manufacturing bottles and similar articles from blown glass, the combination with a bed-plate, of a support, a beam on said support, a neck-mold carried by said beam, a mandrel for said neck-mold, a spindle on said support, and an eccentric for operating said mandrel rotatable on said spindle.

37. In a machine such as described, the combination, with a bed-plate, of a support, a rotatable beam on said support, a neck-mold carried by said beam, and means for locking said beam to said bed-plate.

38. In a machine such as described, in combination, a bed-plate, a support, a rotatable beam on said support, a neck-mold carried by said beam, and means for locking either end of said beam to said bed-plate.

39. A machine such as described including a bed-plate, a beam mounted for rotation above said bed-plate and carrying a mold, and means for locking said beam to said bed-plate.

40. A machine such as described including a bed-plate, a vertically-disposed beam mounted for rotation above said bed-plate, a mold carried by said beam, and means for locking said beam to said bed-plate.

41. In a machine such as described, the combination, with the neck-mold and finishing-mold, of a bottom for the latter, means for supporting said bottom, and means carried by said supporting means for supporting the roughly-formed blank while suspended in said neck-mold.

42. In a machine such as described, the combination, with the finishing-mold, of a bottom for the same, means for raising and lowering said bottom, and means carried by said last-named means for supporting the roughly-formed blank.

43. In a machine such as described, the combination, with the neck-mold and finishing-mold, of a bottom for the latter, a rod supporting said bottom, and means mounted on said rod for supporting the roughly-formed blank while suspended in said neck-mold.

44. In a machine such as described, the combination, with the neck-mold and the finishing-mold, of a bottom for the latter, a rod supporting said bottom, a carriage mounted on said rod, and means mounted on said carriage for supporting the roughly - formed blank while suspended in said neck-mold.

45. In a machine such as described, the combination, with the neck-mold and the finishing-mold, of a bottom for the latter, a rod supporting said bottom, and means mounted on said rod for supporting the roughly-formed blank while suspended in said neck-mold.

46. In a machine such as described, in combination, a neck-mold, a finishing-mold, a bottom for the latter, a rod supporting said bottom, a carriage adjustable on said rod, and means mounted on said carriage for supporting the roughly-formed blank.

In testimony whereof I have signed this specification in the presence of two subscribing witnesses.

CLAUDE BOUCHER.

Witnesses:
    ALPHONSE YERGÉ,
    AUGUSTUS E. INGRAM.